US011518351B2

(12) United States Patent
Tanaka et al.

(10) Patent No.: US 11,518,351 B2
(45) Date of Patent: Dec. 6, 2022

(54) BRAKING CONTROL DEVICE FOR VEHICLE

(71) Applicant: ADVICS CO., LTD., Kariya (JP)

(72) Inventors: Manabu Tanaka, Obu (JP); Shunya Watanabe, Kariya (JP)

(73) Assignee: ADVICS CO., LTD., Kariya (JP)

( * ) Notice: Subject to any disclaimer, the term of this patent is extended or adjusted under 35 U.S.C. 154(b) by 523 days.

(21) Appl. No.: 16/615,506

(22) PCT Filed: May 29, 2018

(86) PCT No.: PCT/JP2018/020434
§ 371 (c)(1),
(2) Date: Nov. 21, 2019

(87) PCT Pub. No.: WO2018/221476
PCT Pub. Date: Dec. 6, 2018

(65) Prior Publication Data
US 2020/0079331 A1 Mar. 12, 2020

(30) Foreign Application Priority Data
May 29, 2017 (JP) .............................. JP2017-105166

(51) Int. Cl.
*B60T 8/17* (2006.01)
*B60T 8/172* (2006.01)
(Continued)

(52) U.S. Cl.
CPC ................ *B60T 8/17* (2013.01); *B60T 8/172* (2013.01); *B60T 8/34* (2013.01); *B60T 13/20* (2013.01);
(Continued)

(58) Field of Classification Search
CPC . B60T 8/17; B60T 17/02; B60T 13/20; B60T 13/745; B60T 2220/00;
(Continued)

(56) References Cited

U.S. PATENT DOCUMENTS

| 6,913,326 B1 | 7/2005 | Ohkubo et al. |
| 2007/0210642 A1* | 9/2007 | Niino ...................... B60T 13/18 303/11 |

(Continued)

FOREIGN PATENT DOCUMENTS

| JP | 2000159094 A | 6/2000 |
| JP | 2014097710 A | 5/2014 |
| JP | 2017077798 A | 4/2017 |

OTHER PUBLICATIONS

International Search Report (PCT/ISA/210) dated Aug. 7, 2018, by the Japanese Patent Office as the International Searching Authority for International Application No. PCT/JP2018/020434.

*Primary Examiner* — Pamela Rodriguez
(74) *Attorney, Agent, or Firm* — Buchanan Ingersoll & Rooney PC (57) ABSTRACT

This braking control device pumps a brake fluid from a reservoir to each wheel cylinder by one fluid pump and includes an electric motor which drives the fluid pump; and a controller which controls the electric motor. The controller calculates a target fluid pressure on the basis of at least one among the vehicle wheel speed, the vehicle deceleration state, and the turning state of the vehicle, calculates a target discharge amount for the fluid pump on the basis of the target fluid pressure, and controls the electric motor on the basis of the target discharge amount. The controller has a front wheel calculation map of the relationship between the fluid pressure and the inflow volume of the brake fluid corresponding to a front wheel cylinder, and a rear wheel calculation map corresponding to a rear wheel cylinder, and (Continued)

calculates the target discharge amount on the basis of the maps.

1 Claim, 4 Drawing Sheets (51) Int. Cl.
*B60T 8/34* (2006.01)
*B60T 13/20* (2006.01)
*B60T 13/66* (2006.01)
*B60T 13/74* (2006.01)
*B60T 17/02* (2006.01)

(52) U.S. Cl.
CPC .......... *B60T 13/662* (2013.01); *B60T 13/745* (2013.01); *B60T 17/02* (2013.01); *B60T 2220/00* (2013.01); *B60T 2240/00* (2013.01); *B60T 2250/00* (2013.01)

(58) Field of Classification Search
CPC ........ B60T 8/172; B60T 8/34; B60T 2240/00; B60T 2250/00; B60T 13/662
See application file for complete search history.

(56) References Cited

U.S. PATENT DOCUMENTS

| | | | |
|---|---|---|---|
| 2008/0300763 A1* | 12/2008 | Mori | B60T 8/4872 701/70 |
| 2018/0297562 A1 | 10/2018 | Ishikawa et al. | |
| 2021/0197779 A1* | 7/2021 | Maruyama | B60T 13/146 |
| 2021/0221231 A1* | 7/2021 | Maruyama | B60T 13/586 |

* cited by examiner

BRAKING CONTROL DEVICE FOR VEHICLE

TECHNICAL FIELD

The present invention relates to a braking control device for a vehicle.

BACKGROUND ART

Patent Literature 1 describes, for the purpose of "obtaining an accumulator-less hydraulic brake device that does not waste energy consumption", "providing each electromagnetic control valve for pressure increase and for pressure decrease between a power fluid pressure source including low-pressure and high-pressure pump and a wheel cylinder. At the time of normal braking, the wheel cylinder is disconnected from the master cylinder, the pump is operated to obtain the target wheel cylinder fluid pressure, all the pressure increasing electromagnetic control valves are opened to increase the wheel cylinder fluid pressure or the pump is in full operation so that the pressure is increased by the control of the pressure increasing electromagnetic control valve. Holding and pressure decrease are performed by closing the pressure increasing electromagnetic control valve and controlling the pressure decreasing electromagnetic control valve. At the time of anti-lock control, the pump is operated to obtain the wheel cylinder fluid pressure of the wheel whose pressure increasing request is the largest, and the wheel cylinder fluid pressure of other wheels is controlled by the electromagnetic control valve for pressure increase and pressure decrease".

Furthermore, Patent Literature 1 describes the following method so that the fluid pressure of the power fluid pressure source is controlled to a magnitude that accurately corresponds to the brake manipulated variable of the driver. A change gradient dP/dt of the braking fluid pressure is determined by the brake manipulated variable of the driver, and thus in a feed-forward control, the supply current I to an electromotor (also referred to as "electric motor MT") is determined in view of a substantial accommodation capacity sum (sum of the substantial operation fluid accommodation capacity on the wheel cylinder side than each pressure increasing electromagnetic control valve that changes according to the opening degree of the four pressure increasing electromagnetic control valves). Here, in the determination of the supply current, "N=k1·I+k2, k1, k2 are constants" is assumed in the relationship between the supply current I to the electromotor and its rotational speed N thereof.

In the electric motor, the relationship between the current and the rotational speed depends on the load (torque) and is not uniquely determined. For example, when the torque is increased while the current is constant, the rotational speed decreases. Furthermore, in the above calculation method, a coefficient αi that changes in accordance with the opening degree of the pressure-increasing electromagnetic control valve (also referred to as "pressure increasing valve VB") is adopted to obtain the substantial accommodation capacity sum. The opening degree of the pressure increasing valve is adjusted to adjust the braking fluid pressure, but when the opening degree changes, the supply current of the electric motor changes in consideration thereof. As a result, the output torque and rotational speed of the electric motor change. That is, in adjusting the braking fluid pressure, the opening degree of the pressure increasing valve is a control target and is a control parameter that determines the supply current of the electric motor, and thus the occurrence of control interference becomes a concern (e.g., in FIG. 24 of Patent Literature, the fluid pressure of the power fluid pressure source is oscillatory). In the fluid pressure control by the electric motor, further improvement in accuracy, stability, and robustness is desired.

CITATIONS LIST

Patent Literature

Patent Literature 1: Japanese Laid-Open Patent Publication No. 2000-159094

SUMMARY OF INVENTION

Technical Problems

An object of the present invention is to provide a braking control device for a vehicle in which braking fluid pressure is increased and adjusted by a fluid pump driven by an electric motor, in which accurate and smooth braking fluid pressure adjustment can be achieved.

Solutions to Problems

A braking control device for a vehicle according to the present invention pumps a brake fluid (BF) from a reservoir (RV) to a wheel cylinder (WC) of each wheel (WH) through one fluid pump (HP) according to a manipulated variable of a braking operation member (BP) of a vehicle to increase a fluid pressure (Pw) of the wheel cylinder (WC), and includes an electric motor (MT) which drives the fluid pump (HP); and a controller (ECU) which controls the electric motor (MT).

In the braking control device of the vehicle according to the present invention, the controller (ECU) is configured to calculate a target fluid pressure (Pt) of the wheel cylinder (WC) based on at least one of a wheel speed (Vw) of each wheel (WH), deceleration state (Gx) of the vehicle, and a turning state (Sa, Gy, Yr) of the vehicle, calculate a target discharge amount (Qt) of the fluid pump (HP) based on the target fluid pressure (Pt); and control the electric motor (MT) based on the target discharge amount (Qt). For example, the controller (ECU) is configured to include a front wheel calculation map (Zqf), which is a relationship between an inflow volume and the fluid pressure (Pwi, Pwj) of the brake fluid corresponding to a front wheel cylinder (WCi, WCj) of the wheel cylinders (WC), and a rear wheel calculation map (Zqr), which is a relationship between an inflow volume and the fluid pressure (Pwk, Pwl) of the brake fluid corresponding to a rear wheel cylinder (WCk, WCl) of the wheel cylinders (WC), and calculate the target discharge amount (Qt) based on the front wheel calculation map (Zqf) and the rear wheel calculation map (Zqr).

According to configuration described above, the electric motor MT is configured by feedback control of the fluid pressure based on the target fluid pressure Pt and feedforward control (i.e., rotational speed feedback control) of the fluid pressure based on the target discharge amount Qt. The target discharge amount Qt is determined based on the target fluid pressure Pt. Thus, only at least one of the wheel speed Vw, the deceleration state Gx of the vehicle, and the turning states Sa, Gy, Yr of the vehicle is adopted for the calculation of the target fluid pressure Pt. That is, the target fluid amount Qt does not include a direct control target of the feedback control. In the fluid pressure control, the feedback control and the feedforward control are separated, and hence the mutual interferences thereof can be avoided and the braking fluid pressure can be suppressed from becoming oscillatory.

DESCRIPTION OF EMBODIMENTS

<Symbols of Configuring Members, Subscripts at the end of Symbols, and Motion/Moving Directions>

An embodiment of a braking control device BS for a vehicle according to the present invention will be described with reference to the drawings. In the following description, configuring members, calculation processes, signals, characteristics, and values having the same symbol such as "ECU" have the same functions. In the rotating direction of an electric motor MT and a fluid pump HP, the "forward rotating direction Hf" corresponds to the direction in which the fluid pressure Pw of the wheel cylinder WC increases and the braking torque of the wheel WH increases. Furthermore, in the movement of the brake fluid BF, the "pressure increasing direction Hw" is a direction from the reservoir RV toward the wheel cylinder WC, and corresponds to the "forward rotating direction Hf".

Subscripts "i" to "k" added to the end of various symbols are comprehensive symbols indicating which wheel they relate to. Specifically, "i" indicates a right front wheel, "j" indicates a left front wheel, "k" indicates a right rear wheel, and "l" indicates a left rear wheel. For example, each of the four wheel cylinders are described as right front wheel cylinder WCi, left front wheel cylinder WCj, right rear wheel cylinder WCk, and left rear wheel cylinder WCl. Furthermore, the subscripts "i" to "k" at the end of the symbol can be omitted. When the subscripts "i" to "k" are omitted, each symbol represents a generic name of each of the four wheels. For example, "WH" represents each wheel, and "WC" represents each wheel cylinder.

Furthermore, subscripts "1" and "2" added to the end of various symbols are comprehensive symbols indicating which system they relate to in the two braking systems. Specifically, "1" indicates the first system and "2" indicates the second system. For example, in the two master cylinder fluid passages, they are expressed as a first master cylinder fluid passage HM1 and a second master cylinder fluid passage HM2. Furthermore, the subscripts "1" and "2" at the end of the symbol can be omitted. When the subscripts "1" and "2" are omitted, each symbol represents a generic name of each of the two braking systems. For example, "CV" represents a check valve for each braking system, and "VM" represents a master cylinder electromagnetic valve of each braking system.

<Embodiment of a Braking Control Device for a Vehicle According to the Present Invention>

Figure 1:
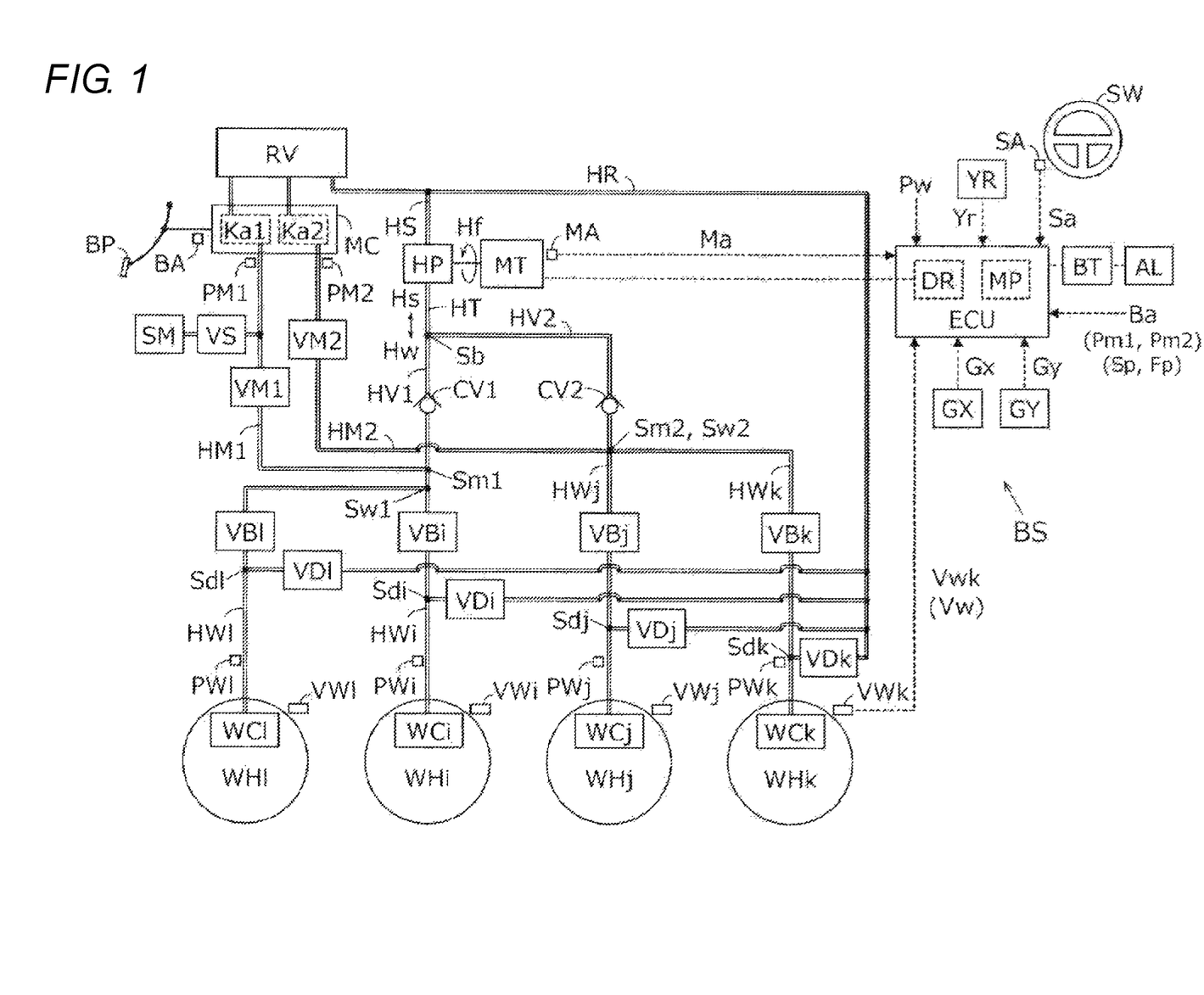
FIG. 1 is an overall configuration view for describing an embodiment of a braking control device BS for a vehicle according to the present invention.

An embodiment of a braking control device BS according to the present invention will be described with reference to an overall configuration view of FIG. 1. In the following description, configuring members, calculation processes, signals, and the like having the same symbol exhibit the same functions, and redundant description may be omitted.

A vehicle including a braking control device BS according to the present invention includes a braking operation member BP, a steering operation member SW, a steering angle sensor SA, a wheel speed sensor VW, a yaw rate sensor YR, a longitudinal acceleration sensor GX, a lateral acceleration sensor GY, and a storage battery BT, and a power generator AL.

The braking operation member (e.g., brake pedal) BP is a member operated by the driver to decelerate the vehicle. The braking torque of the wheel WH is adjusted, and the braking force is generated at the wheel WH by operating the braking operation member BP.

A steering operation member (e.g., steering wheel) SW is a member operated by the driver to turn the vehicle. A steering angle is given to the steered wheels WH (front wheels WHi, WHj), and a lateral force (turning force) is generated at the wheel WH by operating the steering operation member SW. The lateral force causes a turning motion of the vehicle.

The steering operation member SW includes a steering angle sensor SA to detect a steering angle Sa. For example, at the steering angle Sa, the neutral position of the steering operation member SW corresponding to the straight traveling of the vehicle is detected as "0". The turning direction of the vehicle is represented by the sign ("+" or "−") of the steering angle Sa. Each wheel WH includes a wheel speed sensor VW to detect the wheel speed Vw.

The vehicle body of the vehicle is provided with a longitudinal acceleration sensor GX, a lateral acceleration sensor GY, and a yaw rate sensor YR to detect the motion state of the vehicle. Specifically, the longitudinal acceleration Gx and the lateral acceleration Gy are detected by the longitudinal acceleration sensor GX and the lateral acceleration sensor GY. Furthermore, the yaw rate Yr of the vehicle is detected by the yaw rate sensor YR. Here, the steering angle Sa, the yaw rate Yr, and the lateral acceleration Gy are related to the turning of the vehicle, and are therefore referred to as "turning state (or turning state quantity)". The longitudinal acceleration Gx is related to the deceleration of the vehicle, and is therefore referred to as "deceleration state (or deceleration state quantity)".

The vehicle body of the vehicle is provided with the storage battery BT and the power generator AL. The storage battery BT and the power generator AL are also collectively referred to as "power source". Power is supplied to the braking control device BS by the power source (power generator AL, storage battery BT). The storage battery BT and the power generator AL are also the power source of the sensor, and the like.

The braking device mounted on the vehicle includes a wheel cylinder WC, a reservoir RV, a master cylinder MC, and a fluid passage (HM1 etc.).

A rotating member (e.g., brake disc) is fixed to each wheel WH of the vehicle. A brake caliper is arranged to sandwich the rotating member. The brake caliper is provided with the wheel cylinder WC. As the pressure Pw of the brake fluid BF in the wheel cylinder WC is increased by the braking control device BS, a friction member (e.g., brake pad) is pushed against the rotating member. Since the rotating member and the wheel WH are fixed to rotate integrally, a braking torque (braking force) is generated at the wheel WH by the frictional force generated at this time.

The reservoir RV is a tank for working fluid, and stores the brake fluid BF. The reservoir RV is opened to the atmosphere, and the pressure of the brake fluid BF in the reservoir RV is maintained at atmospheric pressure. That is, the reservoir RV is not a pressure sealed type. The brake fluid BF in the reservoir RV is pressure fed toward the wheel cylinder WC through the fluid passage by the master cylinder MC or the braking control device BS, and the brake fluid BF in the wheel cylinder WC is pressurized.

The master cylinder MC is mechanically connected to the braking operation member BP. The master cylinder MC is a tandem type having two pressurizing chambers Ka1 and Ka2. The first pressurizing chamber Ka1 and the second pressurizing chamber Ka2 are defined by an inner wall of the master cylinder MC and two pistons.

When the braking operation member BP is not operated, the first and second pressurizing chambers Ka1 and Ka2 of the master cylinder MC are in communication with the reservoir RV. Therefore, the fluid pressures Pm1 and Pm2 in the master cylinder MC are atmospheric pressure (i.e., "Pm1=Pm2=0").

When the braking operation member BP is operated, the first and second pressurizing chambers Ka1 and Ka2 of the master cylinder MC are disconnected from the reservoir RV, and the operation force of the braking operation member BP is converted to the pressure of the brake fluid BF. The brake fluid BF is pressure fed from the first and second pressurizing chambers Ka1 and Ka2 of the master cylinder MC toward the wheel cylinders WC through the first and second master cylinder fluid passages HM1 and HM2 to be described later. A case where the braking fluid pressure Pw of the wheel cylinder WC is adjusted by the master cylinder MC is referred to as "human powered braking (manual braking)".

The wheel cylinder WC is pressurized by the braking control device BS including the fluid pump HP instead of the master cylinder MC. The braking control device BS has a so-called brake-by-wire configuration. The fluid pump HP takes in the brake fluid BF from the reservoir RV and discharges it toward the wheel cylinder WC. That is, the wheel cylinder WC is pressurized by any one of the master cylinder MC and the fluid pump HP. A case where the braking fluid pressure Pw of the wheel cylinder WC is adjusted by the braking control device BS is referred to as "control braking".

<<Fluid Passages of Two Systems (First Fluid Passage and Second Fluid Passage)>>

Various fluid passages for connecting the master cylinder MC, the wheel cylinder WC, the reservoir RV, and the fluid pump HP will be described. The fluid passage is a passage for moving the brake fluid BF which is the working fluid of the braking control device, and corresponds to a brake pipe, a fluid path of a fluid unit, a hose, and the like. In the fluid passage, the side relatively close to the master cylinder MC or the fluid pump HP is referred to as "upstream side", and the side relatively close to the wheel cylinder WC is referred to as "downstream side".

The first and second master cylinder fluid passages HM1 and HM2 are fluid passages connected to the master cylinder MC. Specifically, the first master cylinder fluid passage HM1 is connected to the first pressurizing chamber Ka1 of the tandem master cylinder MC. The second master cylinder fluid passage HM2 is connected to the second pressurizing chamber Ka2 of the tandem master cylinder MC. The right front wheel cylinder fluid passage HWi, left front wheel cylinder fluid passage HWj, right rear wheel cylinder fluid passage HWk, left rear wheel cylinder fluid passage HWl are fluid passages connected to the four wheel cylinders WCi, WCj, WCk, WCl, respectively. The first master cylinder fluid passage HM1 is connected to the right front wheel cylinder fluid passage HWi and the left rear wheel cylinder fluid passage HWl (also collectively referred to as "first wheel cylinder fluid passage HW1"), and the second master cylinder fluid passage HM2 is connected to the left front wheel cylinder fluid passage HWj and the right rear wheel cylinder fluid passage HWk (also collectively referred to as "second wheel cylinder fluid passage HW2").

A return fluid passage HR is a fluid passage that connects the reservoir RV and the four wheel cylinders WC (WCi, WCj, WCk, WCl). A suction fluid passage HS is a fluid passage that connects one fluid pump HP and the reservoir RV. A discharge fluid passage HT is a fluid passage connected to the discharge port of one fluid pump HP. Therefore, the discharge fluid passage HT is located on the opposite side of the suction fluid passage HS with respect to the fluid pump HP.

One discharge fluid passage HT is divided into two fluid passages HV1 and HV2. The fluid passages HV1 and HV2 are referred to as "dividing passages". A portion Sb where the discharge fluid passage HT is separated into the first dividing passage HV1 and the second dividing passage HV2 is referred to as a "branch portion". The first dividing passage HV1 is a part of the first fluid passage, and is connected to the first master cylinder fluid passage HM1 and the first wheel cylinder fluid passage HW1 (HWi, HWl). Similarly, the second dividing passage HV2 is a part of the second fluid passage, and is connected to the second master cylinder fluid passage HM2 and the second wheel cylinder fluid passage HW2 (HWj, HWk). That is, the first and second dividing passages HV1 and HV2 are fluid passages that divide the brake fluid BF discharged from the single fluid pump HP into two fluid passages, and connect to the first wheel cylinder fluid passage HW1 and the second wheel cylinder fluid passage HW2.

In the first and second dividing passages HV1 and HV2, the movement of the brake fluid BF between the first fluid passages HM1 and HW1 and the second fluid passages HM2 and HW2 is inhibited. For example, in order to separate the first fluid passage and the second fluid passage, first and second check valves CV1, CV2 are provided in the first and second dividing passages HV1, HV2. That is, the first and second check valves CV1, CV2 are disposed downstream of the branch portion Sb. The first and second check valves CV1 and CV2 allow the brake fluid BF to move from the upstream side to the downstream side (movement from the fluid pump HP toward the wheel cylinder WC), but inhibit the movement from the downstream side to the upstream side (movement from the wheel cylinder WC toward the fluid pump HP).

A portion where the four wheel cylinder fluid passages HW and the return fluid passage HR intersect with each other is referred to as a "pressure decreased connecting portion Sd". That is, the connecting portions between the return fluid passage HR and the wheel cylinder fluid passages HWi, HWj, HWk, HW; are the pressure decreased connecting portions Sdi, Sdj, Sdk, Sdl.

First and second master cylinder valves VM1 and VM2 are provided in the first and second master cylinder fluid passages HM1 and HM2. The first and second master cylinder valves VM1 and VM2 are at closed positions so that the wheel cylinder WC is pressure regulated by the fluid pump HP when the braking control device BS operates properly. On the other hand, when the operation of the braking control device BS is inappropriate (e.g., at the time of power failure when the power generator AL and the storage battery BT are malfunctioning), the valves are at the open positions so that the wheel cylinder WC is pressure regulated by the master cylinder MC. At this time, the brake fluid BF pressure fed from the master cylinder MC is not moved toward the fluid pump HP side by the first and second check valves CV1 and CV2.

Each of the wheel cylinder fluid passages HWi, HWj, HWk, and HWl includes a pressure increasing linear electromagnetic valve (also simply referred to as "pressure increasing valve") VB (VBi, VBj, VBk, VBl). The pressure increasing valve VB is a normally opened type, and is at the closed position when anti-skid control, vehicle stabilization control, and the like are executed, and independent pressure regulation is required for each wheel cylinder WC.

The return fluid passage HR is provided with four pressure decreasing linear electromagnetic valves (also simply referred to as "pressure decreasing valves") VD (VDi, VDj, VDk, VDl). The decrease in pressure of each wheel cylinder WC is adjusted by appropriately adjusting the open position of each pressure decreasing valve VD.

<<Braking Control Device BS>>

Next, the braking control device BS will be described. The braking control device BS includes a manipulated variable sensor BA, a braking fluid pressure sensor PW, a controller ECU, an electric motor MT, a fluid pump HP, a stroke simulator SM, a simulator electromagnetic valve VS, a master cylinder electromagnetic valve VM, a pressure increasing linear electromagnetic valve VB, and a pressure decreasing linear electromagnetic valve VD.

The manipulated variable sensor BA is provided on the braking operation member BP. The manipulated variable sensor BA detects a manipulated variable (braking manipulated variable) Ba of the braking operation member BP by the driver. Specifically, as the manipulated variable sensor BA, at least one of a fluid pressure sensor PM that detects the pressure Pm of a master cylinder MC, an operation displacement sensor that detects the operation displacement Sp of the braking operation member BP, and an operation force sensor that detects the operation force Fp of the braking operation member BP is adopted. In other words, the manipulated variable sensor BA is a generic name for the master cylinder fluid pressure sensor PM, the operation displacement sensor, and the operation force sensor. Therefore, the braking manipulated variable Ba is determined based on at least one of the fluid pressure Pm of the master cylinder MC, the operation displacement Sp of the braking operation member BP, and the operation force Fp of the braking operation member BP.

The braking fluid pressure sensor PW is provided to detect the pressure (braking fluid pressure) Pw of the brake fluid BF in each wheel cylinder WC. For example, the fluid pressure sensor PW is built in a fluid unit integrated with the fluid pump HP.

An electronic control unit (also referred to as "controller") ECU is configured by an electric circuit substrate on which a microprocessor MP or the like is mounted and a control algorithm programmed in the microprocessor MP. A detected value (Ba etc.) of each sensor (BA etc.) is input to the controller ECU. The controller ECU controls the electric motor MT and various electromagnetic valves VM, VS, VB, and VD based on an input signal (Ba etc.). Specifically, the controller ECU calculates drive signals for controlling the electric motor MT and various electromagnetic valves VM, VS, VB, and VD. The electrification state of the electric motor MT and the various electromagnetic valves VM, VS, VB, and VD is controlled by the driving circuit DR in the controller ECU based on the drive signal.

In the driving circuit DR, a bridge circuit is formed by switching elements (power semiconductor devices such as MOS-FET and IGBT) to drive the electric motor MT. In the driving circuit DR, the electrification state of each switching element is controlled based on the drive signal for the electric motor MT, and the output and the rotating direction of the electric motor MT are controlled. In the driving circuit DR, the excitation state is controlled based on the drive signal for the electromagnetic valve to drive the various electromagnetic valves VM, VS, VB, and VD. Power supply to the driving circuit DR is carried out by the power generator AL and the storage battery BT.

The electric motor MT is a power source for increasing the pressure of the brake fluid BF in the wheel cylinder WC, and drives the fluid pump HP. For example, a three-phase brushless motor is employed as the electric motor MT. The brushless motor MT is provided with a rotation angle sensor MA that detects a rotor position (rotation angle) Ma. The switching element configuring the bridge circuit is controlled based on the rotation angle Ma. The direction of the electrification amount of the coils of each of the three phases (U phase, V phase, W phase) (i.e., excitation direction) is sequentially switched, and the brushless motor MT is rotationally driven. The driving circuit DR is provided with an electrification amount sensor IA that detects an actual electrification amount Ia (generic name of each phase) of the electric motor MT. For example, a current sensor is provided as the electrification amount sensor IA, and the actual current value Ia is detected.

The brake fluid BF is moved toward the wheel cylinder WC by the fluid pump HP, and the braking fluid pressure Pw of the wheel cylinder WC is increased. Specifically, the single fluid pump HP is rotated in the forward rotating direction Hf by the electric motor MT, and the brake fluid BF is pumped up from the reservoir RV through the suction fluid passage HS. The brake fluid BF is discharged in the pressure increasing direction Hw of the fluid pump HP. In this case, since the master cylinder valve VM is at the closed position, the brake fluid BF from the fluid pump HP is moved to the wheel cylinder WC through the wheel cylinder fluid passage HW, and the braking fluid pressure Pw is increased.

The discharge portion of the fluid pump HP is one (i.e., discharge fluid passage HT), but is separated into two dividing passages HV1 and HV2 at the downstream portion of the fluid pump HP. Check valves (also referred to as "check valve") CV1 and CV2 are provided in each of the first dividing passage HV1 and the second dividing passage HV2. The check valve CV allows the brake fluid BF to move from the fluid pump HP toward the wheel cylinder WC (in the pressure increasing direction Hw), but inhibits the movement from the wheel cylinder WC toward the fluid pump HP (in the pressure decreasing direction Hs). That is, the flow of the brake fluid BF is always maintained in one direction (pressure increasing direction Hw).

When the braking fluid pressure Pw is maintained, the electrification to the electric motor MT is stopped. Even if the output torque of the electric motor MT decreases, the movement of the brake fluid BF in the pressure decreasing direction Hs (referred to as "back flow") is blocked by the check valve CV. Thus, the braking fluid pressure Pw is kept constant.

Similarly, when the braking fluid pressure Pw is decreased, the electrification to the electric motor MT is stopped. In this case, since the brake fluid BF is not returned to the reservoir RV through the fluid pump HP, a return fluid passage HR is provided, and the brake fluid BF is moved toward the reservoir RV through the pressure decreasing valve VD, and the braking fluid pressure Pw is decreased.

A stroke simulator (also simply referred to as a simulator) SM is provided to cause the braking operation member BP to generate an operation force. A piston and an elastic body (e.g., a compression spring) are provided inside the simulator SM. The brake fluid BF is moved from the master cylinder MC into the simulator SM, and the piston is pushed by the flowing brake fluid BF. A force is imparted to the piston in a direction of inhibiting the inflow of the brake fluid BF by the elastic body. The elastic body forms an operation force when the braking operation member BP is operated.

A simulator electromagnetic valve VS is provided between a pressurizing chamber in the master cylinder MC and the simulator SM. The simulator valve VS is a two-position electromagnetic valve having an open position (communication state) and a closed position (blocked state). The simulator valve VS is controlled by a drive signal from the controller ECU. At the time of non-braking or when the braking control device BS is malfunctioning, the simulator valve VS is set to the closed position, and the master cylinder MC and the simulator SM are in the blocked state (non-communication state). In this case, the brake fluid BF from the master cylinder MC is not consumed by the simulator SM. At the time of braking and when the braking control device BS is properly operating, the simulator valve VS is set to the open position, and the master cylinder MC and the simulator SM are in the communication state. In this case, the operation characteristic of the braking operation member BP (the relationship between the operation displacement Sp and the operation force Fp) is formed by the simulator SM. A normally closed electromagnetic valve (NC valve) can be adopted as the simulator valve VS.

The master cylinder valve VM provided in the middle of the master cylinder fluid passage HM is a two-position electromagnetic valve having an open position (communication state) and a closed position (blocked state). A normally opened electromagnetic valve (NO valve) can be adopted as the master cylinder valve VM. The master cylinder valve VM is controlled by a drive signal from the controller ECU. At the time of non-braking or when the braking control device BS is malfunctioning, the master cylinder valve VM is set to the open position, and the master cylinder MC and the wheel cylinder WC are in the communication state. In this case, the braking fluid pressure Pw of the wheel cylinder WC is adjusted by the master cylinder MC. At the time of braking and when the braking control device BS is properly operating, the master cylinder valve VM is set to the closed position, and the master cylinder MC and the wheel cylinder WC are in the blocked state (non-communication state). In this case, the braking fluid pressure Pw is controlled by the braking control device BS.

The pressure increasing valve VB provided in the middle of the wheel cylinder fluid passage HW is a normally opened linear electromagnetic valve (also simply referred to as a "linear valve") having an open position (communication state) and a closed position (blocked state). The pressure increasing valve VB is controlled by a drive signal from the controller ECU. When each braking fluid pressure Pw is not controlled independently (so-called normal braking), the pressurization of the wheel cylinder WC is performed by the fluid pump HP. However, the pressure increasing valve VB is used when independent pressure regulation of each braking fluid pressure Pw is required by anti-skid control or the like. That is, electrification to the pressure increasing valve VB is performed only when individual adjustment (e.g., anti-skid control, vehicle stabilization control) of the braking fluid pressure Pw is executed.

The pressure increasing valve VB (NO valve) is disposed downstream of the connecting portions Sw1 and Sw2 between the dividing passage HV and the wheel cylinder fluid passage HW. At the time of non-braking or when the braking control device BS is malfunctioning, the pressure increasing valve VB is set to the open position (non-electrification state). Since the movement of the brake fluid BF to the fluid pump HP is blocked by the check valve CV, manual braking is possible through the pressure increasing valve VB when the fluid pump HP/electric motor MT is malfunctioning. In this case, the wheel cylinder WC is pressurized by the master cylinder MC, but if the pressure increasing valve VB operates properly, the anti-skid control can be executed if necessary.

The pressure decreasing valve VD provided in the middle of the return fluid passage HR is a normally closed linear valve (NC valve) having an open position (communication state) and a closed position (blocked state). The pressure decreasing valve VD is controlled by a drive signal from the controller ECU. Since the check valve CV is interposed in the dividing passage HV, the braking fluid pressure Pw is not decreased by the reverse drive of the fluid pump HP/electric motor MT. That is, the electric motor MT is rotated only in one direction of the forward rotating direction Hf, and is not rotated in the direction opposite to the forward rotating direction Hf Thus, as the pressure decreasing valve VD arranged in the return fluid passage HR is linearly driven (linear control of the valve-opening amount), the pressure decreasing adjustment of the braking fluid pressure Pw is executed.

<Processing Example in the Controller ECU>

Figure 2:
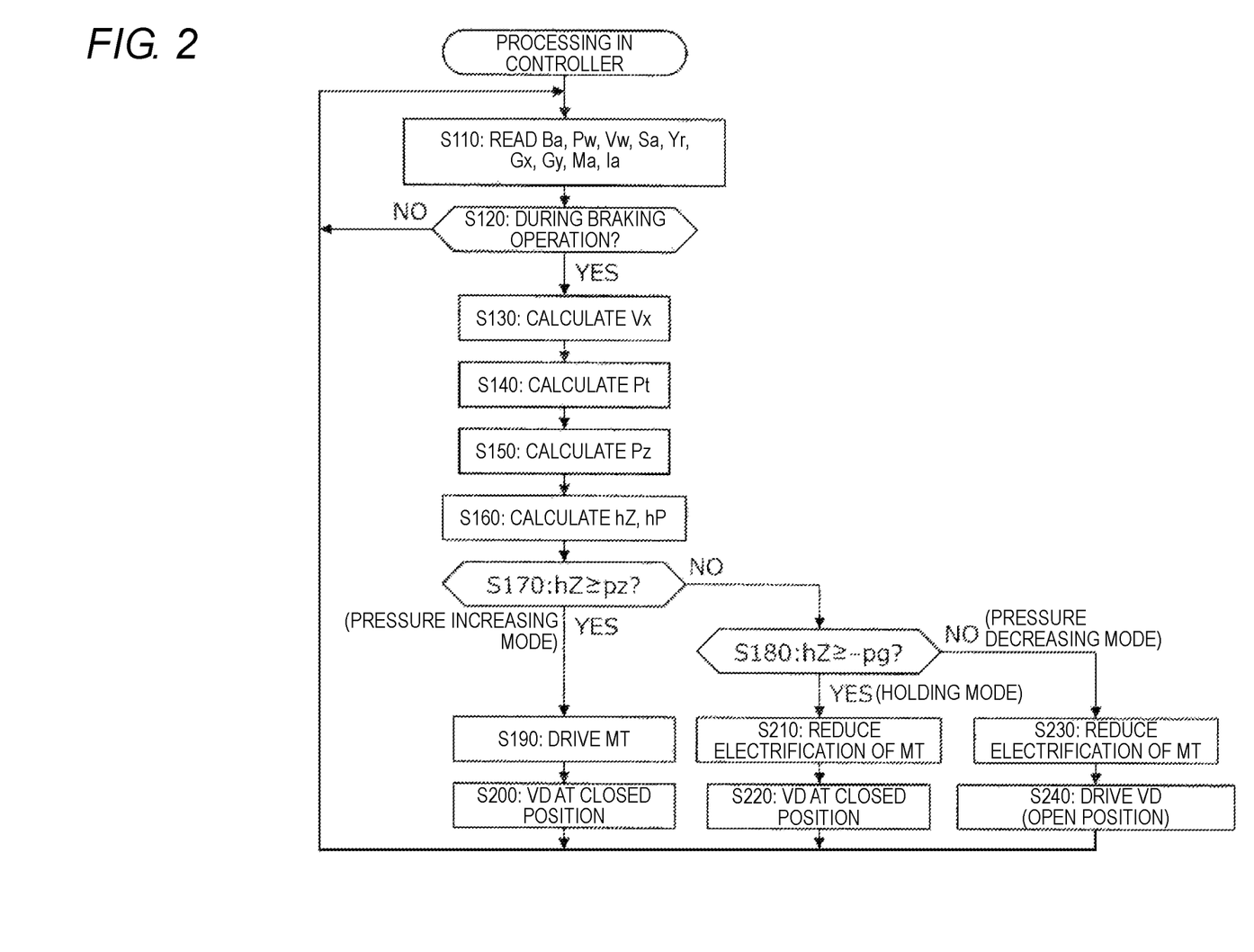
FIG. 2 is a control flow diagram for explaining a processing example in a controller ECU.

A calculation processing example in the controller ECU will be described with reference to the control flow diagram of FIG. 2. In the calculation processing, each mode of control braking (referred to as "control mode") is determined, and the electric motor MT and the linear electromagnetic valves VB and VD are controlled according to the mode. The control mode includes a "pressure increasing mode" for increasing the braking fluid pressure Pw, a "holding mode" for maintaining the braking fluid pressure Pw constant, and a "pressure decreasing mode" for decreasing the braking fluid pressure Pw. In control braking, the simulator valve VS is at the open position, the master cylinder valve VM is at the closed position, and the non-communication state of the master cylinder fluid passage HM is maintained.

In step S110, the braking manipulated variable Ba, the braking fluid pressure Pw, the wheel speed Vw, the steering angle Sa, the yaw rate Yr, the longitudinal acceleration Gx, the lateral acceleration Gy, the rotation angle Ma, and the electrification amount Ia are read. Here, the steering angle Sa, the yaw rate Yr, and the lateral acceleration Gy are state quantities related to vehicle turning, and are collectively referred to as "turning state". Further, since the longitudinal acceleration Gx is a state quantity related to vehicle deceleration, it is also referred to as a "deceleration state".

In step S120, "whether or not it is during the braking operation" is determined based on the braking manipulated variable Ba. For example, when the manipulated variable Ba is greater than or equal to a predetermined value bo, positive determination is made in step S120 and the process proceeds to step S130. On the other hand, when "Ba<bo", negative determination is made in step S120 and the process returns to step S110. Here, the predetermined value bo is a constant set in advance that corresponds to the play of the braking operation member BP.

In step S130, the vehicle body speed Vx is calculated based on the wheel speed Vw. For example, among the four wheel speeds Vw, the fastest one is determined as the vehicle body speed Vx.

In step S140, the target fluid pressure Pt of each wheel WH is calculated based on the manipulated variable Ba and the like. In step S150, the maximum value of the target fluid pressure Pt is determined as a reference fluid pressure Pz. The reference fluid pressure Pz is a target value of the discharge pressure of the fluid pump HP.

In step S160, the fluid pressure deviation hZ is calculated based on the reference fluid pressure Pz and the actual fluid pressure Pw. The deviation hZ is a deviation between the reference fluid pressure Pz and the maximum fluid pressure Px (i.e., "hZ=Pz−Px"). Here, the maximum fluid pressure Px is the maximum of the four fluid pressures Pw. That is, the detected value of the fluid pressure sensor PW corresponding to the reference fluid pressure Pz is the maximum fluid pressure Px. The fluid pump HP/electric motor MT is controlled by the fluid pressure deviation hZ, and the reference fluid pressure Pz is achieved by feedback control or the like.

Furthermore, in step S160, the fluid pressure deviation hP is calculated based on the target fluid pressure Pt and the actual fluid pressure Pw. The deviation hP is a deviation between the target fluid pressure Pt other than the reference fluid pressure Pz and the actual fluid pressure Pw (that is, "hP=Pt−Pw"). The target fluid pressure Pt and the actual fluid pressure Pw correspond to each other in the wheel cylinder WC. The pressure decreasing valve VD is controlled by the deviation hP, and the target fluid pressure Pt other than the reference fluid pressure Pz is achieved. Hereinafter, the pressure regulation control in the wheel corresponding to the reference fluid pressure Pz will be described.

In step S170, "whether or not the fluid pressure deviation hZ is greater than or equal to a predetermined value pz" is determined based on the fluid pressure deviation hZ. Here, the predetermined value (also referred to as "pressure increasing predetermined value") pz is a threshold value for determination, and is a preset constant greater than "0". If "hZ≥pz" and positive determination is made in step S170, the pressure increasing mode is set as the control mode, and the process proceeds to step S190. On the other hand, if "hZ<pz" and negative determination is made in step S170, the process proceeds to step S180.

In step S180, "whether or not the fluid pressure deviation hZ is greater than or equal to a predetermined value −pg" is determined based on the fluid pressure deviation hZ. Here, a predetermined value (also referred to as "pressure decreasing predetermined value") "−pg" is a threshold value for determination, and is a preset constant less than "0". If "hZ≥−pg" and positive determination is made in step S180, the holding mode is set as the control mode, and the process proceeds to step S210. On the other hand, if "hZ<−pg" and negative determination is made in step S180, the pressure decreasing mode is set as the control mode, and the process proceeds to step S230.

In steps S190 and S200, the process of pressure increasing mode is executed. In step S190, the target electrification amount It is calculated based on the deviation hZ. Then, the electric motor MT is driven based on the target electrification amount It. In step S200, the normally closed pressure decreasing valve VD is maintained in the closed position. Note that the normally opened pressure increasing valve VB is also not electrified and remains in the open position. In the pressure increasing mode, the fluid pump HP is driven by the electric motor MT, the brake fluid BF is moved into the wheel cylinder WC, and the braking fluid pressure Pw is increased. That is, the fluid pressure Pw is adjusted by adjusting the output torque of the electric motor MT.

In steps S210 and S220, the process of holding mode is executed. In step S210, the target electrification amount It is decreased toward a predetermined value including "0". That is, the supply current to the electric motor MT is decreased, and the rotation of the electric motor MT comes to a stop. In step S220, while the normally closed pressure decreasing valve VD is maintained in the closed position, the normally opened pressure increasing valve VB is maintained in the open position. The brake fluid BF is held by the check valve CV and the closed position of the pressure decreasing valve VD, and the braking fluid pressure Pw is held constant.

In steps S230 and S240, the process of pressure decreasing mode is executed. In step S230, the target electrification amount It is decreased toward a predetermined value including "0". Similar to the case of the holding mode, the electrification amount to the electric motor MT is decreased, and the rotation of the electric motor MT comes to a stop. In step S240, the pressure decreasing valve VD is linearly controlled based on the fluid pressure deviation hZ. Specifically, the valve-opening amount (lift amount) of the pressure decreasing valve VD is controlled, and the braking fluid pressure Pw is decreased and adjusted. Since the check valve CV prevents the backflow of the brake fluid BF, the pressure increasing valve VB is maintained in the open position even in this situation.

<Driving Process of Electric Motor MT>

Figure 3:
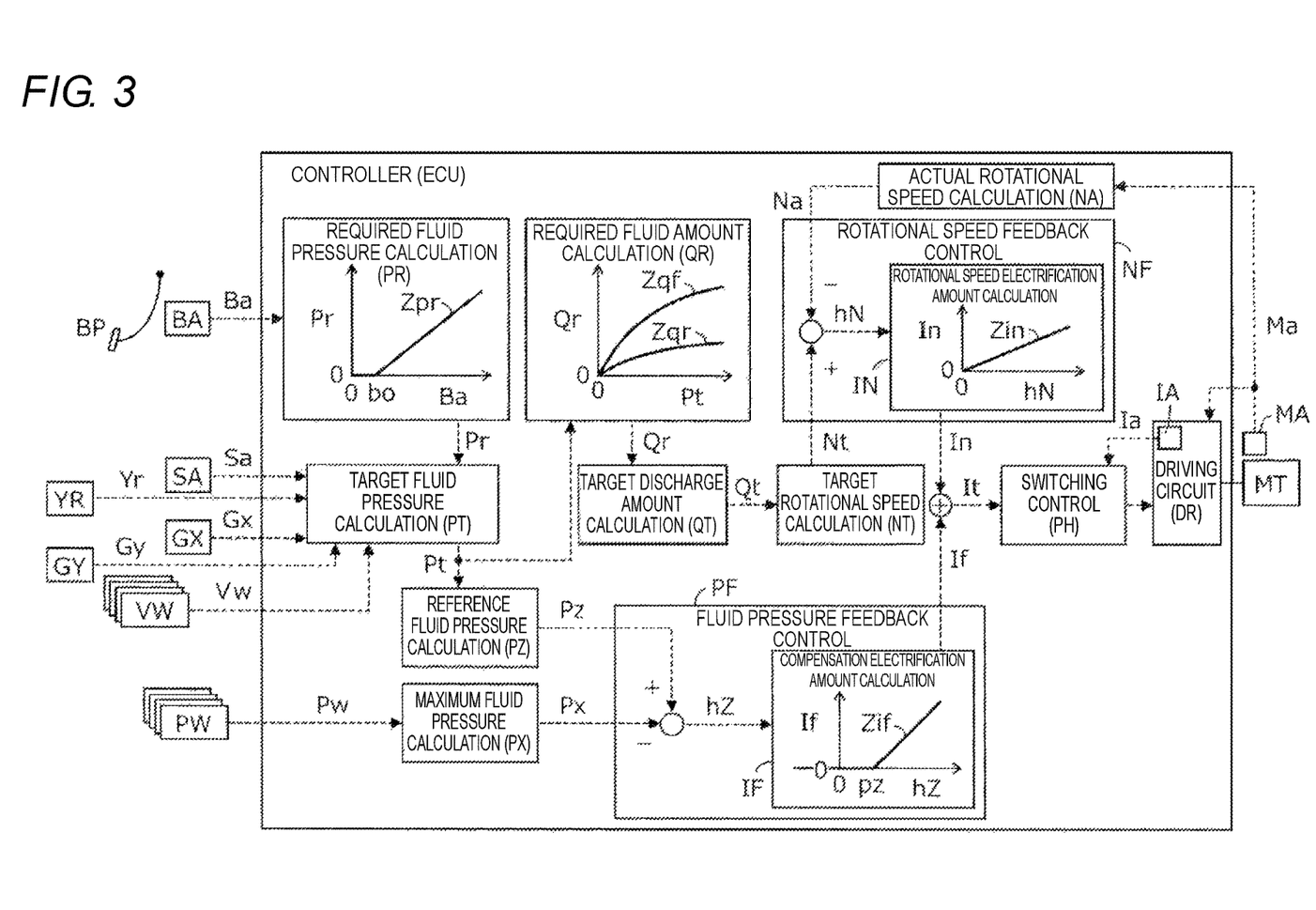
FIG. 3 is a functional block diagram for explaining a driving process of an electric motor MT.

The driving process of the electric motor MT in the controller ECU will be described in detail with reference to the functional block diagram of FIG. 3. In the controller ECU, a signal for driving the switching element of the driving circuit DR is calculated. Based on these drive signals, the switching elements of the driving circuit DR are controlled, and the electrification state to the electric motor MT is adjusted.

The drive signal calculation of the electric motor MT is configured to include a required fluid pressure calculation block PR, a target fluid pressure calculation block PT, a reference fluid pressure calculation block PZ, a maximum fluid pressure calculation block PX, a fluid pressure feedback control block PF, a required fluid amount calculation block QR, a target discharge amount calculation block QT, a target rotational speed calculation block NT, an actual rotational speed calculation block NA, a rotational speed feedback control block NF, and a switching control block PH.

In the required fluid pressure calculation block PR, the required fluid pressure Pr is calculated based on the braking manipulated variable Ba and a calculation map Zpr. The required fluid pressure Pr is a target value of the fluid pressure generated by the fluid pump HP. Specifically, according to the calculation map Zpr, the required fluid pressure Pr is calculated to be "0" in the range where the braking manipulated variable Ba is greater than or equal to "0 (corresponding to non-braking)" and less than the predetermined value bo. When the manipulated variable Ba is greater than or equal to the predetermined value bo, the required fluid pressure Pr is calculated to monotonically increase from "0" as the manipulated variable Ba increases. Here, the predetermined value bo is a preset constant corresponding to the "play" of the braking operation member BP. The required fluid pressure Pr is determined to be the same value in each wheel cylinder WC.

In the target fluid pressure calculation block PT, the required fluid pressure Pr is adjusted based on at least one of the steering angle Sa, the wheel speed Vw, the yaw rate Yr, the longitudinal acceleration Gx, and the lateral acceleration Gy, and the target fluid pressure Pt is calculated. The target fluid pressure Pt is the final target value of the fluid pressure of each wheel cylinder WC. For example, when an unstable state (i.e., an excessive oversteer tendency or an understeer tendency) occurs in the yaw behavior of the vehicle based on the steering angle Sa, the yaw rate Yr, the lateral acceleration Gy, and the like, the target fluid pressure Pt of each wheel cylinder WC is determined individually to resolve the unstable state.

In the target fluid pressure calculation block PT, so-called vehicle stabilization control (also referred to as ESC) is executed and the target fluid pressure Pt is determined. Specifically, when an excessive oversteer tendency is determined, the required fluid pressure Pr corresponding to a turning outer side front wheel is increased to determine the target fluid pressure Pt. When an excessive understeer tendency is determined, the required fluid pressure Pr corresponding to the rear wheels (particularly turning inner side) is increased to determine the target fluid pressure Pt. At the time of non-braking (when "Ba=0"), the required fluid pressure Pr is "0", but each target fluid pressure Pt is determined by the target fluid pressure calculation block PT and automatic pressurization is executed.

In the target fluid pressure calculation block PT, braking force distribution control can be further executed. For example, the distribution between the front and rear wheels is executed based on the longitudinal acceleration Gx, and the target fluid pressure Pt is determined. In the front-rear distribution, the vehicle body speed Vx is referred to, and as the vehicle body speed Vx increases, the required fluid pressure Pr for the front wheels increases and the required fluid pressure Pr for the rear wheels decreases, and each target fluid pressure Pt can be determined. Furthermore, the distribution between the left and right wheels is executed based on at least one of the steering angle Sa, the yaw rate Yr, and the lateral acceleration Gy representing the turning state of the vehicle, and the target fluid pressure Pt is determined. Specifically, the required fluid pressure Pr of the turning outer side wheel is increased, and the required fluid pressure Pr of the turning inner side wheel is decreased, and each target fluid pressure Pt is calculated. The vehicle body speed Vx is determined based on the wheel speed Vw.

In the reference fluid pressure calculation block PZ, the maximum target fluid pressure Pt is determined as the reference fluid pressure Pz. When the adjustment is not performed in the target fluid pressure calculation block PT, the required fluid pressure Pr is determined as the reference fluid pressure Pz. In the target fluid pressure calculation block PT, when the required fluid pressure Pr is adjusted by vehicle stabilization control or the braking force distribution control and the target fluid pressure Pt of each wheel is different, the maximum value among them is calculated as the reference fluid pressure Pz.

In the maximum fluid pressure calculation block PX, the maximum one of the fluid pressures (actual fluid pressures) Pw detected by each fluid pressure sensor PW is determined as the maximum fluid pressure Px. That is, the fluid pressure Pw detected by the fluid pressure sensor PW of the wheel corresponding to the reference fluid pressure Pz is calculated as the maximum fluid pressure Px.

In the fluid pressure feedback control block PF, a compensation electrification amount If of the electric motor MT is calculated with the reference fluid pressure Pz and the maximum actual value Px of the fluid pressure as control variables. In the fluid pressure feedback control block PF, so-called fluid pressure feedback control is executed so that the fluid pressure error hZ is compensated (reduced) and the maximum fluid pressure Px matches the reference fluid pressure Pz.

First, in the fluid pressure feedback control block PF, the reference fluid pressure Pz is compared with the maximum fluid pressure Px. For example, the deviation hZ between the reference fluid pressure Pz and the maximum fluid pressure Px is calculated. The fluid pressure deviation hZ is input as a control variable to the compensation electrification amount calculation block IF.

In the compensation electrification amount calculation block IF, the compensation electrification amount If is calculated based on the fluid pressure deviation hZ and the calculation map Zif. The compensation electrification amount If is a target value of the electrification amount of the electric motor MT. Specifically, according to the calculation map Zif, when the fluid pressure deviation hZ is less than a predetermined value pz (positive value), the compensation electrification amount If is determined to be "0". When the fluid pressure deviation hZ is greater than or equal to the predetermined value pz, the compensation electrification amount If is calculated to monotonically increase from "0" as the fluid pressure deviation hZ increases. Here, the predetermined value (pressure increasing predetermined value) pz is a preset constant and corresponds to the determination threshold value in step S170.

In the fluid pressure feedback control block PF, so-called feedback control based on fluid pressure is executed so that the actual value Px matches the target value Pz (i.e., deviation hZ approaches "0") based on the comparison result (fluid pressure deviation) hZ between the reference fluid pressure Pz and the maximum fluid pressure Px.

Here, the "electrification amount" is a state quantity (state variable) for controlling the output torque of the electric motor MT. Since the electric motor MT outputs a torque that is substantially proportional to the current, the target current of the electric motor MT is adopted as the target electrification amount (physical quantity thereof). Furthermore, when the supply voltage to the electric motor MT increases, the current increases as a result, and hence the supply voltage value can be used as the target electrification amount. Furthermore, since the supply voltage value can be adjusted by the duty ratio in the pulse width modulation, the duty ratio (ratio of electrification time in one cycle) can be adopted as the electrification amount.

In the required fluid amount calculation block QR, the required fluid amount Qr of each wheel is calculated based on each target fluid pressure Pt and the calculation maps Zqf and Zqr. The required fluid amount Qr is a target value of the amount (volume) of the brake fluid BF that should be moved from the fluid pump HP to the wheel cylinder WC in order to achieve the target fluid pressure Pt. The calculation map Zqf corresponds to the front wheel, and the calculation map Zqr corresponds to the rear wheel. Other than the internal leakage of the fluid pump HP, the fluid pressure Pw of the wheel cylinder WC is increased by the amount of brake fluid BF discharged by the fluid pump HP. The relationship between the amount (volume) of brake fluid BP to be discharged and the increase amount of the braking fluid pressure Pw is based on the rigidity of calipers, hydraulic pipes (fluid passages), friction members, and the like arranged around the wheels. Thus, the calculation map Zqf for the front wheels in which the amount of liquid consumed by the member is relatively large and the calculation map Zqr for the rear wheels in which the amount of liquid consumed is relatively small are provided separately.

The target fluid pressure Pt is calculated to increase with the "upwardly convex" characteristic according to the increase in the target fluid pressure Pt of the front wheel based on the front wheel calculation map Zqf (relationship between the inflow volume and the fluid pressures Pwi and Pwj of the brake fluid BF in the front wheel cylinders WCi and WCj). Furthermore, the target fluid pressure Pt is calculated to increase with the "upwardly convex" characteristic, smaller than that for the front wheel, according to the increase in the target fluid pressure Pt of the rear wheel based on the rear wheel calculation map Zqr (relationship between the inflow volume and the fluid pressures Pwk and Pwl of the brake fluid BF in the rear wheel cylinders WCk and WCl). The front wheel and rear wheel calculation maps Zqf and Zqr are obtained experimentally.

In the target discharge amount calculation block QT, all of the required fluid amounts Qr of each wheel are added to calculate the target discharge amount (target fluid amount) Qt (i.e., "Qt=/QC). The target fluid amount Qt is a target value of the discharge amount of the fluid pump HP necessary to achieve each target fluid pressure Pt. Since the discharge amount per one rotation of the fluid pump HP is determined in advance, the target fluid amount Qt is correlated with the number of rotations of the fluid pump HP.

In the target rotational speed calculation block NT, the target rotational speed Nt of the electric motor MT is calculated based on the target fluid amount (target discharge amount) Qt. The discharge amount per one rotation of the fluid pump HP is determined by the specifications of the fluid pump HP. Therefore, in the target rotational speed calculation block NT, the target fluid amount Qt is time-differentiated to calculate the target flow rate (movement amount of the brake fluid BF per unit time) dQ. Then, a target value Nt of the rotation speed (rotational speed) of the fluid pump HP (that is, the electric motor MT) is calculated based on the target flow rate dQ.

In the actual rotational speed calculation block NA, the actual rotational speed Na is calculated based on the rotation angle Ma. Specifically, the rotation angle Ma detected by the rotation angle sensor MA is time-differentiated to determine the actual rotational speed Na.

In the rotational speed feedback control NF, the rotational speed electrification amount In of the electric motor MT is calculated using the target rotational speed Nt and the actual rotational speed Na as control variables. In the rotational speed feedback control NF, so-called rotational speed feedback control is executed so that the rotational speed deviation hN is compensated (reduced) and the actual rotational speed Na matches the target rotational speed Nt. The rotational speed feedback control of the electric motor corresponds to feedforward control in the fluid pressure control. That is, the fluid pressure control includes feedback control (fluid pressure feedback control block PF) and feedforward control (rotational speed feedback control block NF).

First, in the rotational speed feedback control NF, the target rotational speed Nt and the actual rotational speed Na are compared. For example, the deviation hN between the target rotational speed Nt and the actual rotational speed Na is calculated. The rotational speed deviation hN is input as a control variable to the rotational speed electrification amount calculation block IN.

In the rotational speed electrification amount calculation block IN, the rotational speed electrification amount In is calculated based on the rotational speed deviation hN and the calculation map Zin. The rotational speed electrification amount In is a target value of the electrification amount of the electric motor MT. Specifically, the rotational speed electrification amount In is calculated to monotonically increase from "0" as the rotational speed deviation hN increases based on the calculation map Zin.

The target electrification amount It is calculated by adding the rotational speed electrification amount In to the compensation electrification amount If. The target electrification amount It (=If +In) is a target value of the final electrification amount for the electric motor MT. The output torque of the electric motor MT (i.e., increase amount of the braking fluid pressure Pw) is determined by the magnitude of the target electrification amount It. The target electrification amount It is input to the switching control block PH.

When the fluid pressure deviation hZ is less than the predetermined value pz and the control mode is the holding mode or the pressure decreasing mode, the compensation electrification amount If is calculated to "0" based on the calculation map Zif. In the holding mode or the pressure decreasing mode, the fluid pump HP does not need to discharge more brake fluid BF, and this the rotational speed electrification amount In is determined to be "0". Therefore, in the holding mode or the pressure decreasing mode (when "hZ<pz"), the target electrification amount It is set to "0" and the electrification to the electric motor MT is stopped.

Furthermore, when internal leakage of the fluid pump HP is considered, the electric motor MT is driven at a constant speed (predetermined rotational speed) in the holding mode or the pressure decreasing mode. Therefore, when the pressure increasing mode is changed to the holding mode (or pressure decreasing mode), the target electrification amount It is decreased to a predetermined value including "0" (electrification amount that achieves the predetermined rotational speed). Here, the target electrification amount It is not suddenly decreased, but a change speed is limited and can be gradually decreased toward a predetermined value including "0". As described above, in the holding mode or the pressure decreasing mode, the target electrification amount It is decreased, so that power saving of the electric motor MT is achieved.

In the switching control block PH, a drive signal for performing pulse width modulation is calculated for each switching element based on the target electrification amount It. The duty ratio of the pulse width of each phase (U phase, V phase, W phase) of the electric motor MT (ratio of on-time with respect to one cycle) is determined based on the target electrification amount It and the rotation angle Ma. Then, each switching element of the driving circuit DR is driven based on the duty ratio (target value).

The driving circuit DR is provided with an electrification amount sensor (e.g., a current sensor) IA for each phase, and an actual electrification amount (current value) Ia is detected. The detected value Ia of each phase is input to the switching control block PH, and so-called current feedback control is executed to match the target value It. Specifically, the duty ratio is corrected (finely adjusted) based on the deviation between the actual value Ia of the electrification amount and the target value It.

In the controller ECU, feedback control of the braking fluid pressure is executed so that the maximum fluid pressure (actual value) Px approaches the reference fluid pressure (target value) Pz based on the reference fluid pressure Pz and the deviation hZ of the maximum fluid pressure Px. For example, the actual fluid pressure Pw is detected as an analog signal, and is input to the controller ECU through an analog/digital conversion process (so-called AD conversion). Through the AD conversion, the fluid pressure Pw is detected as a stepped value for each "1 (unit)" LSB. Here, LSB is the least significant bit and is the resolution of the signal. Furthermore, in order to reduce analog noise, the fluid pressure Pw is subjected to filter processing (e.g., low-pass filter processing). However, after the AD conversion and filtering, the detected value Pw is temporally delayed, and a relatively fast braking operation may become difficult to respond.

In the controller ECU, the target rotational speed Nt is determined based on the target fluid pressure Pt, and the rotational speed feedback control of the electric motor MT is executed so that the actual rotational speed Na approaches the target rotational speed Nt based on the deviation hN between the target rotational speed Nt and the actual rotational speed Na (time-differentiated value of the rotation angle Ma detected by the rotation angle sensor MA). The rotational speed feedback control corresponds to the feed-forward control in the fluid pressure control. The rotation angle Ma is detected as a digital signal and input to the controller ECU without being AD converted. Since the rotation angle Ma is a digital signal, it is less affected by noise compared to the analog signal. For this reason, the filtering process is unnecessary, or the cutoff frequency of the filter can be set high. As a result, the time delay of the detected value Ma is relatively small. The delay of the fluid pressure Pw is compensated by the rotational speed feedback control, and the fluid pressure control having sufficient responsiveness can be achieved with respect to a relatively fast braking operation.

Furthermore, the target rotational speed Nt is calculated based on the target fluid amount (target discharge amount) Qt, but the calculation does not include the direct control result of the fluid pressure feedback control. That is, the target rotational speed Nt is determined based only on state quantities (manipulated variable Ba, steering angle Sa, yaw rate Yr etc.) that are not directly controlled by the fluid pressure feedback control. Thus, the control interference between the fluid pressure feedback control and the rotational speed feedback control is suppressed, and the braking fluid pressure can be avoided from becoming oscillatory.

<Driving Process of Linear Electromagnetic Valves VD and VB>

Figure 4:
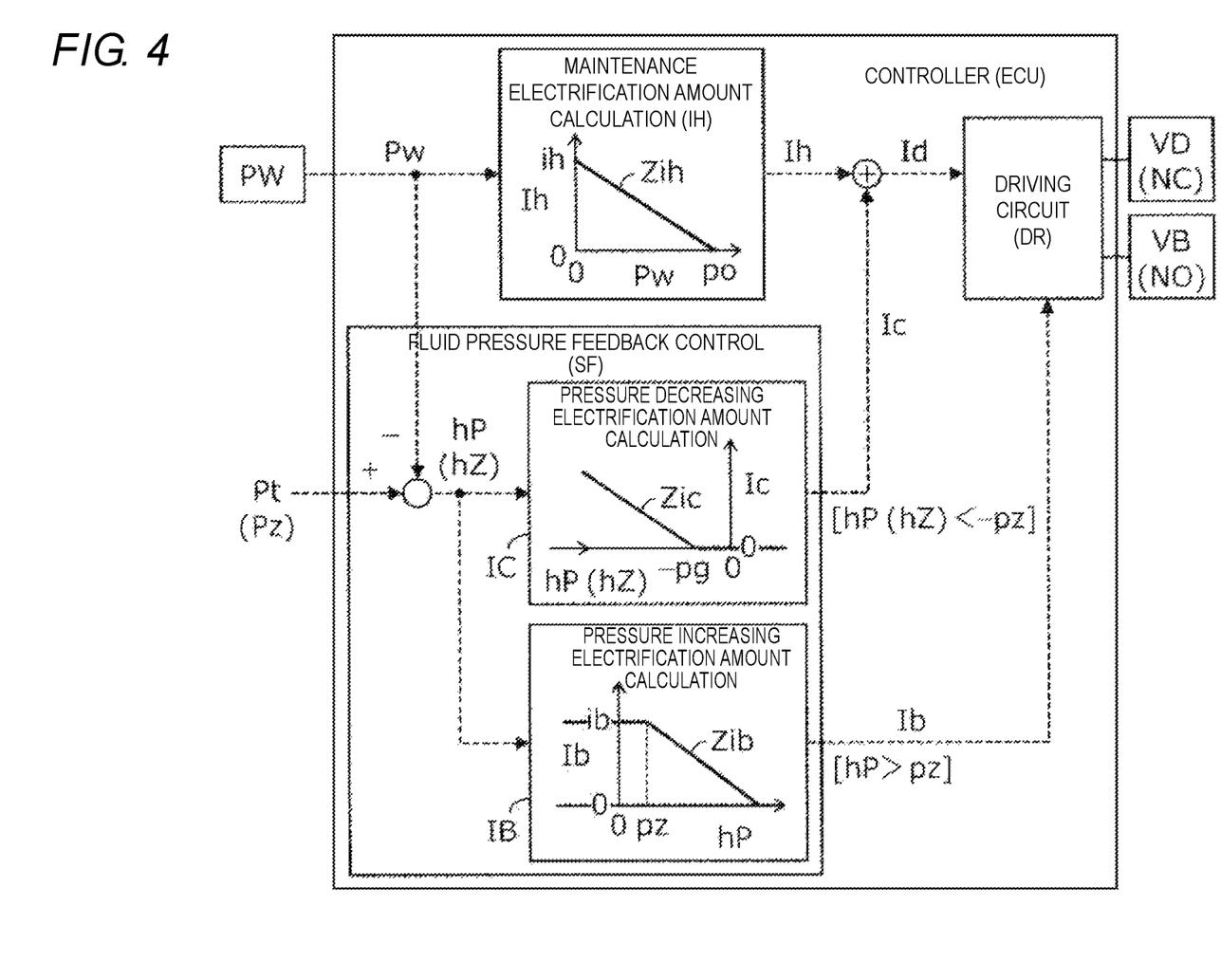
FIG. 4 is a functional block diagram for explaining a driving process of electromagnetic valves VD and VB.

The details of the driving process of the electromagnetic valves VD and VB in the controller ECU will be described with reference to the functional block diagram of FIG. 4. In the controller ECU, a signal for driving the switching element of the driving circuit DR is calculated. The switching elements of the driving circuit DR are controlled based on these drive signals, and the electromagnetic valves VD and VB are driven.

First, a case where the required fluid pressure Pr is not adjusted in the target fluid pressure calculation block PT and is "Pt=Pr" is described. In this case, in the pressure increasing mode, the fluid pressure is adjusted by the fluid pump HP/electric motor MT. In the holding mode, the rotation of the electric motor MT is reduced toward stop, but the backflow of the brake fluid BF is inhibited by the check valve CV, and hence the fluid pressure Pw is maintained. In the pressure decreasing mode, the electrification to the electric motor MT is stopped (or decreased), and the brake fluid BF is moved to the reservoir RV through the pressure decreasing valve VD. That is, the pressure decrease is adjusted by the pressure decreasing valve VD.

The drive signal calculation of the pressure decreasing valve VD is configured by a maintenance electrification amount calculation block IH and a fluid pressure feedback control block SF. Here, the electrification amount is a state quantity (control variable) for controlling the valve-opening amount (also referred to as "lift amount") of the electromagnetic valve, as in the case of the electric motor MT. Any of a target current, a supply voltage, and a duty ratio can be adopted as the target electrification amount (its physical quantity).

In the maintenance electrification amount calculation block IH, the maintenance electrification amount Ih is calculated based on the braking fluid pressure Pw and the calculation map Zih. The maintenance electrification amount Ih is a target value of the electrification amount to the pressure decreasing valve VD for maintaining the braking fluid pressure Pw at that value. Specifically, according to the calculation map Zih, when the braking fluid pressure Pw is "0", the maintenance electrification amount Ih is calculated to a predetermined value ih (corresponding to the fully opened state of the pressure decreasing valve VD). As the braking fluid pressure Pw increases from "0", the maintenance electrification amount Ih is calculated to monotonically decrease from the predetermined value ih. When the braking fluid pressure Pw is a predetermined value po, the maintenance electrification amount Ih is determined to be "0 (corresponding to the fully closed state of the pressure decreasing valve VD)".

In the fluid pressure feedback control block SF, similar to the case of the electric motor MT, the so-called feedback control based on the fluid pressure is executed so that the actual value Pw matches the target value Pt (i.e., deviation hP approaches "0") based on the comparison result (fluid pressure deviation) hP between the target fluid pressure Pt (=Pr) and the actual fluid pressure Pw. In the fluid pressure feedback control block SF, the deviation hP between the target fluid pressure Pt and the actual fluid pressure Pw is calculated. The fluid pressure deviation hP is input as a control variable to the pressure decreasing electrification amount calculation block IC.

In the pressure decreasing electrification amount calculation block IC, the pressure decreasing electrification amount Ic is calculated based on the fluid pressure deviation hP and the calculation map Zic. The pressure decreasing electrification amount Ic is a target value of the electrification amount of the pressure decreasing valve VD. Specifically, according to the calculation map Zic, when the fluid pressure deviation hP is less than a predetermined value −pg (negative value), the pressure decreasing electrification amount Ic is calculated to be larger as the fluid pressure deviation hP becomes smaller. In other words, in "hP<−pg", the pressure decreasing electrification amount Ic is determined to decrease as the fluid pressure deviation hP increases. When the fluid pressure deviation hP is greater than or equal to the predetermined value −pg, the pressure decreasing electrification amount Ic is determined to be "0". Here, the predetermined value (pressure decreasing predetermined value) −pg is a preset constant.

The pressure decreasing electrification amount Ic is added to the maintenance electrification amount Ih, and the required electrification amount Id is calculated. The required electrification amount Id (=Ih+Ic) is a target value of the final electrification amount of the pressure decreasing valve VD. The valve-opening amount of the pressure decreasing valve VD (i.e., the pressure decreasing amount of the braking fluid pressure Pw) is determined by the magnitude of the required electrification amount Id. The required electrification amount Id is input to the driving circuit DR. The pressure decreasing valve VD is controlled by the driving circuit DR, and as a result, the braking fluid pressure Pw is decreased and adjusted.

Next, a case where the required fluid pressure Pr is adjusted in the target fluid pressure calculation block PT will be described. In this case, the maximum value of the target fluid pressure Pt is determined as the reference fluid pressure Pz. Furthermore, the fluid pressure Pw of the wheel corresponding to the reference fluid pressure Pz is determined as the maximum fluid pressure Px. The fluid pressure Px corresponding to the reference fluid pressure Pz is regulated by the method similar to above. That is, in the pressure increasing mode, the maximum fluid pressure Px is controlled by the fluid pump HP/electric motor MT, and in the pressure decreasing mode, the electric motor MT is stopped and the maximum fluid pressure Px is controlled by the pressure decreasing valve VD.

The target fluid pressure Pt other than the reference fluid pressure Pz is adjusted by the method similar to above in the pressure decreasing mode and the holding mode. However, in the pressure increasing mode, the fluid pressure is adjusted by the pressure increasing valve VB. The discharge pressure of the fluid pump HP (fluid pressure of the discharge fluid passage HT) is adjusted based on the reference fluid pressure Pz. Therefore, the target fluid pressure Pt excluding the one corresponding to the reference fluid pressure Pz is smaller than the discharge pressure of the fluid pump HP. Thus, the discharge pressure of the fluid pump HP is adjusted by the pressure increasing valve VB, and the fluid pressure Pw is adjusted.

Specifically, the pressure increasing valve VB is controlled based on the pressure increasing electrification amount Ib calculated in the pressure increasing electrification amount calculation block IB of the fluid pressure feedback control block SF. In the fluid pressure feedback control block SF, the fluid pressure deviation hP is calculated based on the target fluid pressure Pt and the actual fluid pressure Pw. The fluid pressure deviation hP is input as a control variable to the pressure increasing electrification amount calculation block IB.

In the pressure increasing electrification amount calculation block IB, the pressure increasing electrification amount Ib is calculated based on the fluid pressure deviation hP and the calculation map Zib. The pressure increasing electrification amount Ib is a target value of the electrification amount of the pressure increasing valve VB. Specifically, according to the calculation map Zib, when the fluid pressure deviation hP is less than a predetermined value pz (positive value), the pressure increasing electrification amount Ib is determined to be the predetermined value ib. Here, the predetermined value (pressure increasing predetermined value) pz is a preset constant. The predetermined value ib is a preset constant for maintaining the pressure increasing valve VB in a fully closed state. Therefore, in "hP<pz (pressure decreasing mode or holding mode)", the pressure increasing valve VB is maintained in the closed position.

When the fluid pressure deviation hP is greater than or equal to the predetermined value pz (positive value), the pressure increasing electrification amount Ib is calculated to monotonically decrease from the predetermined value ib according to the calculation map Zib. The valve-opening amount (lift amount) of the electromagnetic valve VB is controlled by the pressure increasing electrification amount Ib. As the fluid pressure deviation hP increases, the valve-opening amount of the normally opened pressure increasing valve VB is increased, and the fluid pressure Pw is increased to approach the target fluid pressure Pt. That is, so-called feedback control based on fluid pressure is executed so that the actual value Pw matches the target value Pt.

<Operation/Effect>

In the braking device, the braking fluid pressure depends on the volume of the brake fluid BF flowing into the wheel cylinder WC. The configuring members provided on the wheels, such as brake calipers and friction members, have rigidity (i.e., deform with respect to force), so that the configuring members deform when the brake fluid BF flows into the wheel cylinder WC, and the braking fluid pressure is generated. When the friction member (brake pad) is pushed against the rotating member (brake disc) as a result, braking torque is generated at the wheel WH.

Patent Literature 1 (see in particular paragraphs 0084 and 0085) describes the problem of the feedforward control of the supply current I to the electric motor based on a value $(\Sigma(\alpha i \cdot Vi))$ obtained by multiplying a coefficient ai based on the opening degree of the pressure increasing valve to the volume Vi of the wheel cylinder WC or the like. Specifically, after the target fluid pressure becomes substantially constant, the fluid pressure of the power fluid pressure source and the actual fluid pressure fluctuate greatly. In this state, occasions where the pressure increasing valve is fully closed increases and the substantial accommodation capacity sum becomes small, and thus the feedback gain set in accordance with the large substantial accommodation capacity sum becomes excessively large, the fluctuation of the supply current with respect to the electric motor becomes too large and the fluid pressure of the power fluid pressure source and the actual fluid pressure fluctuate greatly. Thus, in the device of Patent Literature 1, the feedback gain is set according to the substantial accommodation capacity sum.

The fundamental factor of control interference is that the result of feedback control (i.e., state quantity αi based on the opening degree of the pressure increasing valve) is included in the feedforward control. That is, as the actual value of the fluid pressure and the target value are matched by feedback control, when the opening degree of the pressure increasing valve is changed, the current component by the feedforward control changes accordingly. In the electric motor, the relationship between the current and the rotational speed depends on the load (braking fluid pressure). Thus, when the braking fluid pressure, the supply current, and the motor rotational speed are maintained in an equilibrium state by the feedback control, the supply current is unnecessarily changed by feedforward control, and hence the equilibrium state becomes difficult to be maintained. As a result, the above-described feedback control and the feedforward control may interfere with each other.

As the state quantity (control variable) of the feedforward control, the quantity (volume) Qt of the brake fluid BF to be discharged from the fluid pump HP is determined based on each target fluid pressure Pt. Specifically, each required fluid amount Qr is calculated based on each target fluid pressure Pt and calculation maps Zqf and Zqr. Here, the front wheel calculation map Zqf is a relationship between the inflow volume and the fluid pressures Pwi and Pwj of the brake fluid BF corresponding to the front wheel cylinders WCi and WCj. The rear wheel calculation map Zqr is a relationship between the inflow volume and the fluid pressures Pwk and Pwl of the brake fluid BF corresponding to the rear wheel cylinders WCk and WCl. The target discharge amount Qt is determined by adding the required fluid amount Qr of each wheel. That is, the target discharge amount Qt is the sum of the required fluid amounts Qr.

In the calculation of the target fluid pressure Pt, in addition to the manipulated variable Ba, only at least one of the wheel speed Vw, the vehicle deceleration state (e.g., longitudinal acceleration) Gx, and the vehicle turning state (generic term of steering angle Sa, lateral acceleration Gy, yaw rate Yr) is adopted. That is, in the calculation of the target fluid amount Qt (target value of the discharge amount of the fluid pump), the direct control target (e.g., valve-opening amount of the pressure increasing valve VB, etc.) of the feedback control is not included. In other words, feedback control and feedforward control are separated in the control variable. Thus, mutual interference between feedback control and feedforward control is avoided, and highly accurate and highly robust fluid pressure control can be achieved.

<Other Embodiments>

Hereinafter, other embodiments (modified examples) will be described. In other embodiments, similar effects as described above (enhancement in accuracy, stability, and robustness of fluid pressure control by reduction of control interference) are obtained.

As described above, configuring members, calculation processes, signals, characteristics, and values denoted by the same symbols are of the same function. Subscripts "i" to "k" added to the end of various symbols are comprehensive symbols indicating which wheel they relate to. "i" indicates the right front wheel, "j" indicates the left front wheel, "k" indicates the right rear wheel, and "l" indicates the left rear wheel. If the suffixes "i" to "k" at the end of the symbol are omitted, each symbol represents the generic name of each of the four wheels. The subscripts "1" and "2" added to the end of various symbols are comprehensive symbols indicating which of the two braking systems they relate to. "1" indicates the first system and "2" indicates the second system. When the subscripts "1" and "2" are omitted, each symbol represents a generic name of each of the two braking systems.

In the embodiments described above, a disk type braking device has been illustrated as a device for applying a braking torque to the wheel WH. Instead, a drum type braking device (drum brake) may be adopted. In a case where a drum brake is adopted, a brake drum is adopted in place of the caliper. The friction member is a brake shoe, and the rotating member is a brake drum.

In the embodiments described above, a diagonal type (also referred to as "X type") has been illustrated as the two system hydraulic circuit (configuration of brake pipe). Instead, an anterior-posterior type (also referred to as "H-type") configuration may be adopted. In this case, the first fluid passage is connected to the front wheel cylinders WCi and WCj, and the second fluid passage is fluidly connected to the rear wheel cylinders WCk and WCl.

The invention claimed is:

1. A braking control device for a vehicle that pumps a brake fluid from a reservoir to a wheel cylinder of each wheel through one fluid pump according to a manipulated variable of a braking operation member of the vehicle to increase a fluid pressure of each wheel cylinder, the braking control device comprising:
   an electric motor which drives the fluid pump; and
   a controller which controls the electric motor,
   wherein the controller is configured to
      calculate a target fluid pressure of each wheel cylinder based on at least one of a wheel speed of each wheel, deceleration state of the vehicle, and a turning state of the vehicle,
      calculate a target discharge amount of the fluid pump based on the target fluid pressure, and
      control the electric motor based on the target discharge amount;
   wherein the controller is configured to include a front wheel calculation map, which is a relationship between an inflow volume and the fluid pressure of the brake fluid corresponding to a front wheel cylinder of the wheel cylinders, and a rear wheel calculation map, which is a relationship between an inflow volume and the fluid pressure of the brake fluid corresponding to a rear wheel cylinder of the wheel cylinders, and calculate the target discharge amount based on the front wheel calculation map and the rear wheel calculation map.

* * * * *